(12) United States Patent
Lyren

(10) Patent No.: US 10,496,360 B2
(45) Date of Patent: *Dec. 3, 2019

(54) EMOJI TO SELECT HOW OR WHERE SOUND WILL LOCALIZE TO A LISTENER

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 139 days.

This patent is subject to a terminal disclaimer.

(21) Appl. No.: 15/913,927

(22) Filed: Mar. 7, 2018

(65) Prior Publication Data
US 2019/0278552 A1   Sep. 12, 2019

(51) Int. Cl.
| | |
|---|---|
| G06F 17/00 | (2019.01) |
| G06F 3/16 | (2006.01) |
| G06F 3/0484 | (2013.01) |
| H04S 7/00 | (2006.01) |
| G06F 3/0482 | (2013.01) |

(52) U.S. Cl.
CPC ............ *G06F 3/165* (2013.01); *G06F 3/0482* (2013.01); *G06F 3/04847* (2013.01); *H04S 7/303* (2013.01); *H04S 2420/01* (2013.01)

(58) Field of Classification Search
CPC .............................. G06F 3/04817; G06F 3/165
See application file for complete search history.

(56) References Cited

U.S. PATENT DOCUMENTS

| | | | | |
|---|---|---|---|---|
| 6,990,205 | B1 * | 1/2006 | Chen ....................... | H04S 1/002 |
| | | | | 381/17 |
| 2008/0319764 | A1 * | 12/2008 | Nagle .................... | G10L 19/008 |
| | | | | 704/500 |
| 2017/0046123 | A1 * | 2/2017 | Song ......................... | H04S 7/30 |
| 2017/0293461 | A1 * | 10/2017 | McCauley .............. | G06F 3/165 |

OTHER PUBLICATIONS

Burgess, "Techniques for Low Cost Spatial Audio," UIST '92, Nov. 1992, copyright 1992 ACM, p. 53-59. (Year: 1992).*
Pugliese et al., "ATSI: Augmented and Tangible Sonic Interaction," TEI 2015, Jan. 2015, USA, copyright 2015 ACM, p. 97-104. (Year: 2015).*

* cited by examiner

*Primary Examiner* — Amelia L Tapp

(57) ABSTRACT

A method displays an emoji that enables a user to select how or where sound will localize to a listener of the sound associated with the emoji. During an electronic communication between a first user and a second user, the first user selects how or where sound of the emoji will localize to the second user. When the second user receives the emoji, the sound plays to the second user how or where as selected by the first user.

20 Claims, 8 Drawing Sheets

Display, with a display of an electronic device of a first user, a graphical representation such that the first user selects how and/or where sound of the graphical representation localizes to a second user.
100

Receive, at the electronic device of the first user, a selection from the first user as to how and/or where the sound of the graphical representation localizes to the second user.
110

Transmit the graphical representation and sound to an electronic device of the second user.
120

Play, at the electronic device of the second user, the sound to the second user as to how and/or where the first user selected.
130

Figure 1

Receive, during an electronic communication between a first user with a first electronic device and a second user with a second electronic device and at the second electronic device, a graphical representation that plays sound to the second user.
200

Sound play as BS?
210

No → Display the graphical representation to the second user with no indication or an indication the sound is provided as mono or stereo sound.
220

Yes ↓

Display the graphical representation to the second user with (1) an indication as to how sound will localize and/or (2) an indication where the sound will externally localize binaural sound to the second user.
230

Figure 2

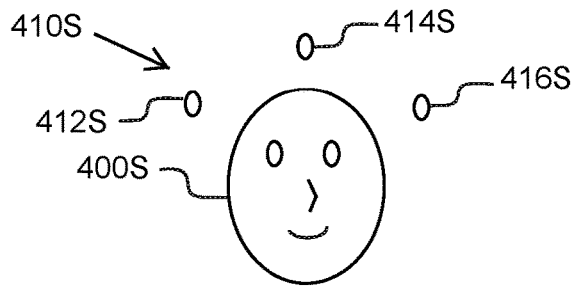
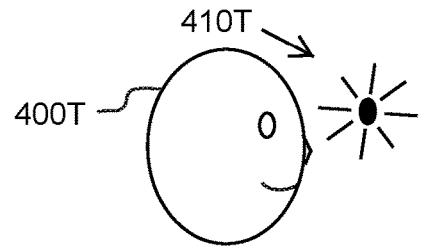
Figure 4S Figure 4T
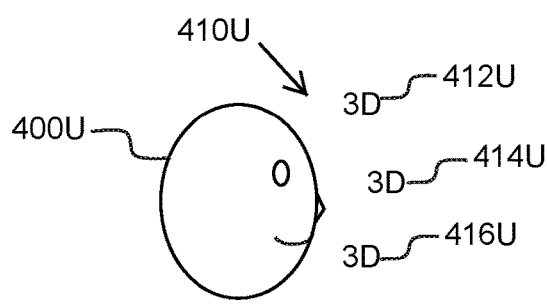
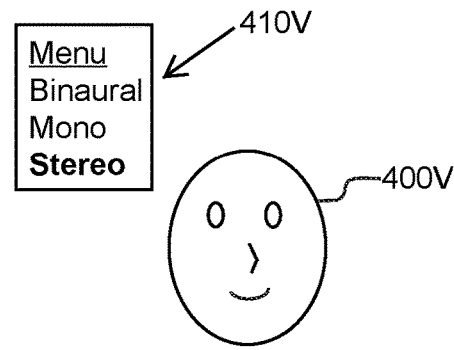
Figure 4U Figure 4V
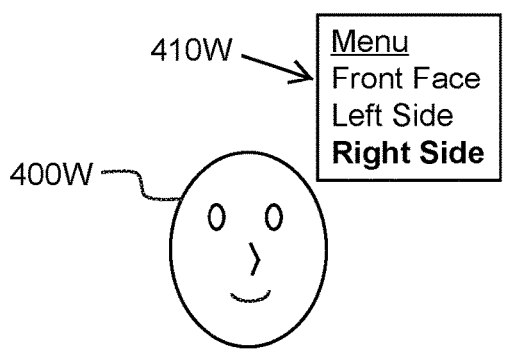
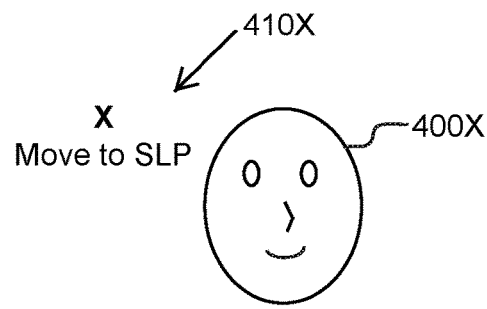
Figure 4W Figure 4X

EMOJI TO SELECT HOW OR WHERE SOUND WILL LOCALIZE TO A LISTENER

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIG. 1 is a method that enables a user to select how and/or where sound from a graphical representation will localize to a listener in accordance with an example embodiment.

FIG. 2 is a method that displays a graphical representation to a user that selects how and/or where sound from the graphical representation will localize to a listener in accordance with an example embodiment.

FIG. 4S is a graphical representation with an indication of binaural sound in accordance with an example embodiment.

FIG. 4T is a graphical representation with an indication of binaural sound in accordance with an example embodiment.

FIG. 4U is a graphical representation with an indication of binaural sound in accordance with an example embodiment.

FIG. 4V is a graphical representation with an indication of binaural sound in accordance with an example embodiment.

FIG. 4W is a graphical representation with an indication of binaural sound in accordance with an example embodiment.

FIG. 4X is a graphical representation with an indication of binaural sound in accordance with an example embodiment.

SUMMARY

Figure 3:
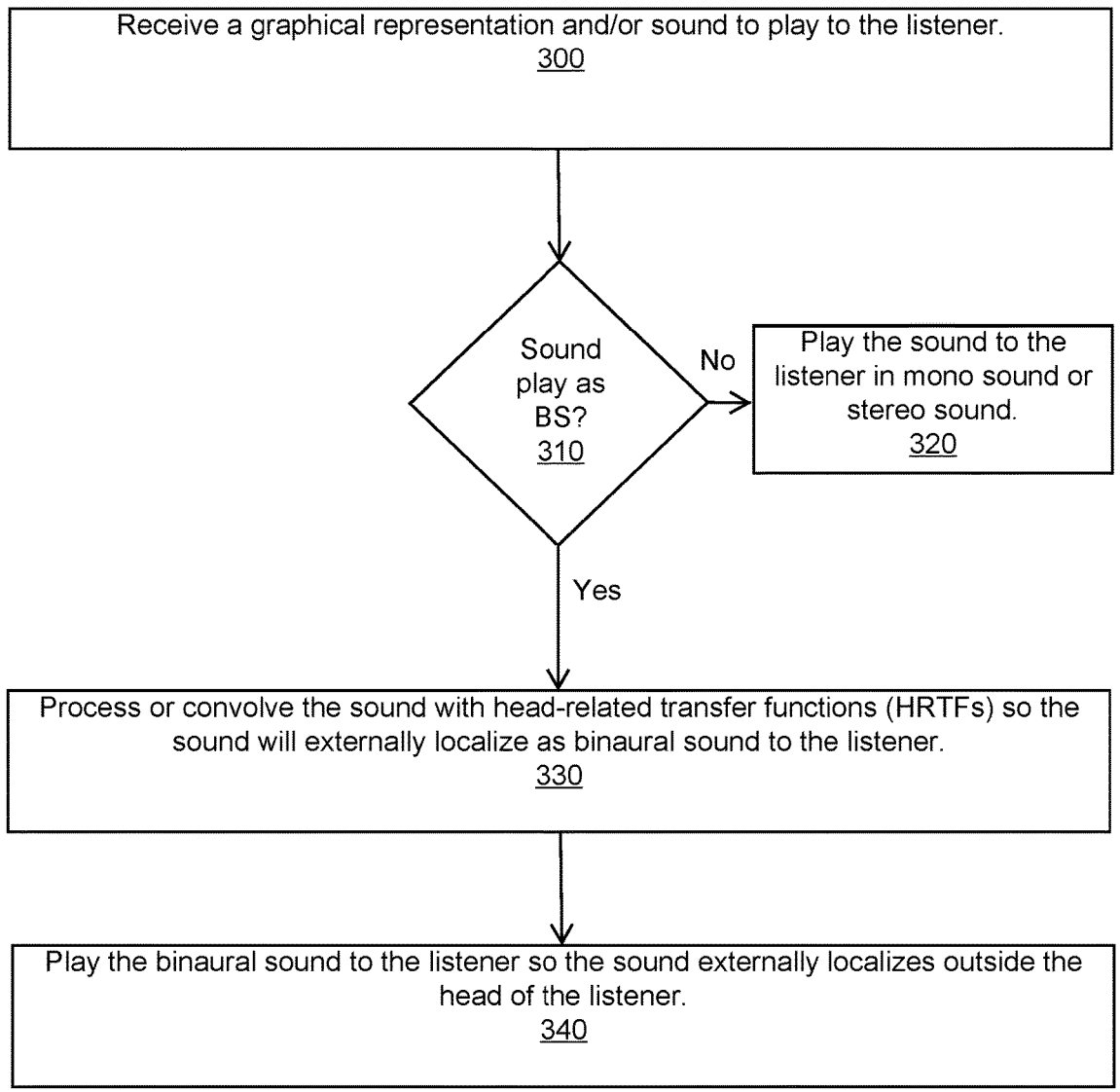
FIG. 3 is a method to convolve sound into binaural sound when the listener will hear the sound as binaural sound in accordance with an example embodiment.

One example embodiment is a method or apparatus that includes graphical representations that plays sound in one or more of stereo sound, mono sound, or binaural sound to a listener. A user selects how and/or where sound of the graphical representation will localize to the listener.

Other example embodiments are discussed herein.

DETAILED DESCRIPTION

Binaural sound or three-dimensional (3D) sound externally localizes away from a head of the listener, unlike stereo or mono sound that localizes inside the head of the listener or localizes to a physical sound speaker. Thus, when a listener hears binaural sound, a source or location of the sound occurs outside the head of the listener even though this location may be in empty space or space not occupied with a physical sound speaker.

Binaural sound has many technical challenges and problems, especially when users exchange or play binaural sound during an electronic communication. Example embodiments offer solutions to these challenges and problems.

One problem during an electronic communication is that users do not know whether the other user is hearing or will hear the sound as stereo sound, mono sound or binaural sound. For example, when a first user talks to or sends audio messages to a second user, the first user does not know whether the second user will hear the sound as stereo, mono, or binaural. As another example, the first user sends the second user a graphical representation that plays sound upon activation, but the first user does not know or cannot control whether the second user hears the sound as stereo, mono, or binaural sound. Further, the first user may desire or intend that the second user hear the sound in a particular format (e.g., binaural sound) but has no control over how the sound plays to the second user.

As another problem is that the users do not know where the sound will localize with respect to the other person. Even if both users are knowingly exchanging binaural sound, the users would not be aware where the binaural sound is externally localizing with respect to the listener. Consider an example of a telephone call in which the users hear the voice of each other in binaural sound or another electronic communication in which the parties exchange graphical representations that play binaural sound. Here, the first user talking or communicating with the second user would not know where the sound originates to the second user. For example, does the second user hear the voice of the first user as originating one meter away, two meters away, three meters away, etc.? Further, where does the sound originate with respect to the head of the second user? Does the sound originate away from and on a left side of the head of the second user, on a right side of the head of the second user, in front of the head of the second user, etc.? The first user does not know where the second user hears the sound.

Example embodiments solve these problems and others. By way of example, an example embodiment enables one user to select or control how and/or where the second user hears sound during an electronic communication. For example, a first user can select how the second user hears the sound as one or more of stereo sound, mono sound, and binaural sound. The first user knows in advance of the second user hearing the sound how the second user will hear the sound.

As another example, the first user can select or control where the second user hears binaural sound. For instance, the first user selects a location where the sound will originate to the second user. The first user knows in advance of the second user hearing the binaural sound where the second user will hear or is hearing the sound.

FIG. 1 is a method that enables a user to select how and/or where sound from a graphical representation will localize to a listener in accordance with an example embodiment.

Block 100 states display, with a display of an electronic device of a first user, a graphical representation such that the first user selects how and/or where sound of the graphical representation localizes to a second user.

During an electronic communication between the first user and the second user, each user can control or select how the sound localizes to the other user. In this way, the users can control or select how the other user hears the sound (e.g., as one or more of stereo sound, mono sound, and binaural sound).

The users can also control or select where the other user hears sound when the sound is binaural sound. This selection includes a location or sound localization point (SLP) where the sound originates to the listener. For example, the first user can select a distance or how far the sound originates or emanates away from the head of the second user (the listener). Additionally, the first user can select a location where the sound originates or emanates with respect to the head of the second user. This location can be a general location to the second user, such as on a left side of the head, in front of the head, on a right side of the head, above the head, behind the head, etc. This location can be more specific to the second user, such as a specific coordinate location with respect to the head of the second user, compass direction with respect to the second user, a physical object near or proximate to the second user, or other locations with respect to the second user.

The location is not required to be with respect to the head of the user. For example, the first user selects an object in a room where the second user is located, and the sound originates from this object.

The first user selects how and/or where sound of the graphical representation localizes to a second user in a variety of different ways. As one example, the graphical representation itself includes an indication or selection. For instance, the first user clicks or activates a part of the graphical representation to make the selection. As another example, the indication or selection occurs near or proximate the graphical representation. For instance, the indication or selection simultaneously displays with the graphical representation. As another example, the first user provides a command or instruction to the electronic device to make the selection. For instance, the first user provides a voice command, hand gesture, body movement, eye movement, head movement, menu selection, mouse click, touchscreen activation, or another method to make the selection.

By way of example, the graphical representation displays to the user with an indication as to how or where sound will localize. For instance, graphical representations display with an indication that sound the listener is hearing or is going to hear will be mono sound or stereo sound. This indication can include visual or audio information that informs or instructs the user that the sound will localize as one of mono sound and stereo sound.

Consider an example in which the indication visually informs the user of how and/or where the sound will localize using one or more of text, color, brightness, shading, flashing or dimming of light, words, symbols, drawings, characters, photos, images, or other indicia or other examples discussed herein. For instance, the indication includes the word "stereo" or "mono" or "3D" or a symbol that the user recognizes or associates with stereo, mono, or binaural sound.

In an example embodiment, the indication forms part of the graphical representation. For example, the indication is inside, on, or touching the graphical representation. Alternatively, the indication is separate or away from the graphical representation. For example, the indication simultaneously displays as a symbol or word separated from the graphical representation.

Consider an example in which the user speaks one of the words "stereo" or "mono" or "3D" to indicate the selection of how sound is provided to the listener. A natural language user interface receives the selection, and the electronic device transmits the sound to the second user as selected by the first user. Consider an example in which locations around the graphical representations correspond to locations around the head of the second user. When the first user selects one of these locations, the sound localizes to the second user at the selected location. For instance, when the first user selects a location to a right side of the graphical representation, the sound is convolved with head-related transfer functions (HRTFs) having coordinates corresponding to a right side of the head of the user. In this way, sound externally localizes away from and to a right side of the head of the second user. When the first user selects a location to a left side of the graphical representation, the sound is convolved with HRTFs having coordinates corresponding to a left side of the head of the user. In this way, sound externally localizes away from and to a left side of the head of the second user.

Consider an example in which clicking, selecting, or activating the graphical representation selects stereo, mono, or binaural sound or switches between these types of sound. For example, when the user clicks the graphical representation a first time, the sound is provided to the second user in binaural sound. When the user clicks the graphical representation a second time, the sound is provided to the second user in stereo sound. When the user clicks the graphical representation a third time, the sound is provided to the second user in mono sound.

Block 110 states receive, at the electronic device of the first user, a selection from the first user as to how and/or where the sound of the graphical representation localizes to the second user.

In an example embodiment, the first user interacts with one or more user interfaces or electronic devices to make the selection. By way of example, the electronic device senses, detects, or receives one or more of a voice command, a hand gesture, body motion, eye movement, head movement, click, menu selection, touch (e.g., on a touch screen), etc.

The user can also make the selection with a wand, electronic pen, or other handheld electronic device.

Consider an example in which the first user makes the selection by providing an instruction or command to an electronic device, such as a handheld portable electronic device (HPED), wearable electronic device (WED), headphones, a smartphone, an electronic watch, a television or display, a smart speaker, a server, or another electronic device.

Block 120 states transmit the graphical representation and sound to an electronic device of the second user.

The graphical representation and the sound transmit to the electronic device of the second user or an electronic device in communication with the electronic device of the second user. For example, the graphical representation and sound transmit from an electronic device of the first user to an electronic device of the second user or from a server in communication with the electronic device of the second user.

Consider an example in which the first user has a HPED or WED that includes a wireless transmitter/receiver that wirelessly transits the graphical representation and/or sound over one or more wireless networks to a HPED or WED of the second user.

Consider an example in which the first and second users communicate with each other via electronic devices (such as smartphones) that execute a mobile messaging software application. The electronic device of first user includes a microphone and camera that records a voice and facial images of the first user that will be played to the second user. The electronic device processes and stores the facial images as a three-dimensional (3D) graphical representation and transmits the graphical representation and sound over a wireless network (e.g., the internet or cellular network) to the electronic device of the second user.

Block 130 states play, at the electronic device of the second user, the sound to the second user as to how and/or where the first user selected.

The electronic device of the second user plays the sound to the second user according to the selection(s), instructions (s) of the first user. In this way, the first user determines how the sound plays to the second user (e.g., as mono sound, stereo sound, and/or binaural sound) and/or where the sound plays to the second user (e.g., the SLP where the sound originates or emanates to the second user).

The electronic device also provides or displays the graphical representation to the second user. For example, the electronic device of the second user displays the graphical representation on, thru, or with a display.

Consider an example in which the sound corresponds to or is associated with the graphical representation. When the second user, electronic device, or software application activates the graphical representation, the sound plays to the second user according to how and/or where the first user previously selected.

Consider an example in which the first and second user communicate with each via electronic devices. The electronic device of the first user displays a graphical representations (e.g., a plurality of different emoji or animoji) that play voice greetings or voice messages. For example, when activated these graphical representations play a recorded voice that says "Hello" or "How are you?" or "Hahahaha" or another message. The first user selects a graphical representation that includes a red-shaped heart and sound recording that plays "I love you." The first user selects this recording to play as binaural sound to the second user at a SLP having spherical coordinates of (r=1.0 m, θ=30°, φ=0°).

The first user selects the graphical representation, and in response to this selection, the graphical representation of the red-shape heart appears on a display of an electronic device of the second user. When the second user selects the red-shaped heart a voice says "I love you" to the second user. This voice externally localizes to the second user as binaural sound and originates in empty space away from the head of the second user at the SLP of (r=1.0 m, θ=30°, φ=0°) selected by the first user.

Consider an example in which an electronic device of the first user displays a 3D emoji. When the first user selects this emoji, microphones record his or her voice message as a voice message that will be played to the second user. Selection of this emoji automatically designates the voice message as being in binaural sound. Further, selection of this emoji automatically applies a SLP where the sound will localize to the second user. For example, this location is set as a default location or previously set by the first user. The first user sends the 3D emoji to the second user. When the 3D emoji appears on the display of the electronic device of the second user, the 3D emoji automatically plays the voice message in binaural sound to the second user. The voice message externally localizes to the default location or previously set location (e.g., one meter away from the head of the second user and to a left side or right side of the face of the second user).

The first user selects or determines how the second user will hear the sound (e.g., whether the second user will hear sound from the graphical representation as binaural sound or one of mono and stereo sounds) and where the second user will hear the binaural sound when binaural sound is provided to the second user (e.g., a location or SLP from where the sound will externally localize to the second user). These selections can be made through a single selection or multiple selections. For example, the first user individually or separately selects how the sound will localize and where the sound will localize. As another example, the first user makes a single selection that provides both how the sound will localize and where the sound will localize. For example, the first user selects a SLP in empty space one to two meters away from the head of the second user for where the binaural sound will localize to the second user. In this instance, the first user does not have to also select binaural sound since the selected SLP is a binaural sound location. Mono and stereo sound cannot externally localizes one to two meters away from the head of the second user unless an electronic speaker is at this location. For example, mono and stereo sound cannot be heard thru headphones so the sound externally localizes away from or outside of the head of the listener.

Consider an example in which a display of a first electronic device of the first user displays a graphical representation that includes a first visual indication that when selected plays the sound from the graphical representation to the second user in the binaural sound and that includes a second visual indication that when selected plays the sound from the graphical representation to the second user in one of the mono sound or the stereo sound. The first user is thus able to select between providing the sound to the second user as one or more of stereo sound, mono sound, and binaural sound.

The indication(s) can appear in or as part of the graphical representation. For example, the indication forms part of the body or appears on or with the graphical representation (e.g., the indication is simultaneously displayed with the graphical representation). Alternatively, the indication(s) can appear removed from the graphical representation or not with the graphical representation. For example, the first user selects the indications from menu, sidebar, or another location that is not part of the graphical representation itself.

By way of example, the first user interacts with the electronic device and selects one of the indications. For instance, the electronic device receives a voice command, senses hand movement or body movement of the first user, receives a click or selection on a touchscreen, receives the selection from a mouse or handheld device (e.g., an electronic pen, wand, or handheld controller), etc. Alternatively, the selection occurs automatically. For instance, opening a software program automatically selects a certain graphical representation.

The graphical representation and/or sound transmit to or are provided to the electronic device of the second user. For example, the first electronic device transmits the graphical representation and/or sound to the second electronic device. As another example, a server or another electronic device in communication with the second electronic device provides the graphical representation and/or sound to the second electronic device.

The graphical representation can be displayed at the electronic device of the second user with or without the indications or selections of the first user. For example, the visual indication(s) are removed from the graphical representation or not displayed with the graphical representation. As another example, the visual indications are displayed with the graphical representation. In this way, the second user can see the selections of the first user (e.g., how the sound will localize and/or where the sound will localize to the second user).

Consider an example in which the graphical representation shows the first user where the sound will localize to the second user. For instance, the graphical represents the head of the second user, and the visual indication shows the SLP with respect to the graphical representation and hence the head of the second user. In this way, both the first user and the second user can see where the sound will localize or is localizing to the second user.

When sound is selected to be binaural sound, then the sound plays and externally localizes outside the head of the second user. For example, the sound originates or emanates from a SLP that is in empty space (e.g., where no physical or tangible object exists) or in occupied space.

Consider an example in which the first electronic device receives or obtains one or more head-related transfer functions (HRTFs) for convolving sound to the second user. These HRTFs include generic HRTFs or ones customized or individualized to the second user. In this way, a processor, such as a digital signal processor (DSP), in the first electronic device or in communication with the first electronic device (e.g., a server) processes or convolves the sound before the sound is transmitted and/or provided to the electronic device of the second user. When the second electronic device receives or obtains the sound, the sound is already processed or convolved and ready to play as binaural sound. A processor in the second electronic device is not required to process or convolve the sound into binaural sound so the sound can immediately play to the second user without consuming processing resources of the second electronic device or without requiring processing time before being played to the second user.

The visual indication can uses words, symbols, or other indicia to identify the sound as being binaural sound. For example, the graphical representation includes a symbol "3D" that signifies three-dimensional sound or the binaural sound. For example, this symbol is located inside a body of the graphical representation or near or proximate to the graphical representation being displayed.

In an example embodiment, a location of the visual indication with respect to the graphical representation shows the users a relative location of the where the sound will localize or is localizing to the second user. For example, when the graphical representation symbolizes or represents the head of the second user, then the location of the visual indication with respect to the graphical representation shows a relative location of the SLP with respect to the head of the second user. The first and second user can quickly ascertain where the sound will externally localize with respect to the head or body of the second user.

HRTFs can be stored with coordinate locations that correspond to the coordinate locations on the display. The coordinate location of the indication provides the coordinate location of the HRTF pairs that are retrieved from memory.

Consider an example in which the graphical representation being displayed represents the head of the second user. A first visual indication includes an indication located on a right side of the graphical representation and a second indication located on a left side of the graphical representation. These two indications provide the first user with two options to select where the sound can localize to the second user. If the first user selects the first visual indication on the right side of the graphical representation, then the sound will externally localizes as binaural sound to the second user on a right side of the head of the second user. If the first user selects the second visual indication on the left side of the graphical representation, then the sound will externally localizes as binaural sound to the second user on a left side of the head of the second user.

In this example embodiment, the first user can select between two different locations where the sound will externally localize as binaural sound with respect to the head of the second user. Example embodiments, however, include more locations or less locations (e.g., enabling the first user to select between three different locations, four different locations, five different locations, etc.).

Furthermore, these visual indications and corresponding SLPs are not limited to a particular location with respect to the second user. By way of example, the visual indications and SLPs include, but are not limited to, in front of and to a left side of the head of the second user, in front of and to a right side of the head of the second user, in front of the head of the second user, above the head of the second user, below the head of the second user, on a left side of the head of the second user, on a right side of the head of the second user, etc.

In an example embodiment, the second use can visually see where the sound will localize with respect to his or her head before the sound actually localizes to the location or while the sound is localizing to the location. The second user thus sees where the first user selected the sound to externally localize as the binaural sound to the second user.

The visual indications can also provide how the sound will or is localizing to the second user. For example, a first visual indication or a first option that when selected provides the sound to the second user as one of stereo sound or mono sound. A second visual indication or a second option that when selected provides the sound to the second user as the binaural sound. The first use is thus able to control where sound localizes to the second user before the second user hears the sound or before the sound plays to the second user. For instance, the first user selects between playing the sound to the second user as binaural sound that externally localizes outside a head of the second user and playing the sound to the second user as one of stereo sound and mono sound.

Consider an example in which the display of the electronic device shows three different visual indications or options for where the sound will or is localizing to the second user. These options enable the first user to select where the sound will localize to the second user and include (1) a location with respect to the head of the second user having azimuth coordinates ($0°<\theta\leq45°$) or a location in front of and on a right side of the head of the second user, (2) a location with respect to the head of the second user having azimuth coordinates ($0°>\theta\geq-45°$) or a location in front of and on a left side of the head of the second user, and (3) a location inside the head of the second user (e.g., the sound being provided as mono sound or stereo sound through headphones of the second user).

When the first user makes a selection as to how sound will localize and/or where sound will location, the electronic device of the second displays this selection or results of this selection. In this way, the electronic device displays a visual indication informing the second user that the first user selected playing of the sound to the second user as the binaural sound that externally localizes outside the head of the second user.

Example embodiments include expediting playing or processing of the sound. One embodiment, for example, expedites processing or convolving of the sound of the graphical representation at the second electronic device by convolving, with a digital signal processor (DSP), the sound with HRTFs to change the sound into the binaural sound before transmitting the graphical representation and the sound from the first electronic device to the second electronic device and in response to receiving the selection of the first visual indication at the first electronic device. The DSP can be located in the first electronic device or a server in communication with the first and/or second electronic devices. When the electronic device of the second user receives the graphical representation and/or sound, the sound is already convolved into binaural sound as selected by the first user and is ready for immediate play to the second user. The second user does not have to wait for a processor to convolve the sound since this convolution already occurred. The DSP convolves the sound with the HRTFs before one or more of (1) the sound is provided to the electronic device of the second user, (2) the sound is retrieved by the electronic device of the second user, (3) the sound is transmitted to the electronic device of the second user (e.g. wirelessly transmitted by a server or the first electronic device to the second electronic device), (4) the second user requests the sound to play, and (5) the second user activates the graphical representation to play the sound.

Example embodiments include saving processing resources of the DSP in the electronic device of the second user. One embodiment, for example, processes the sound before the sound is transmitted to, provide to, or retrieved by the second electronic device of the second user. In this way, the DSP in the second electronic device is not required to devote processing resources to convolution of the sound since the sound is already convolved into binaural sound and ready for immediate play to externally localize to the selected SLP.

FIG. 2 is a method that displays a graphical representation to a user that selects how and/or where sound from the graphical representation will localize to a listener in accordance with an example embodiment.

Block 200 states receive, during an electronic communication between a first user with a first electronic device and a second user with a second electronic device and at the second electronic device, a graphical representation that plays sound to the second user.

For example, two or more users talk and/or message each other over one or more networks, such as the Internet, cellular network, etc. The users transmit and/or exchange graphical representations to each other during the electronic communication. For instance, the first user sends the second user the graphical represent, and/or the second user sends the first user a graphical representation.

The graphical representation can include or be associated with sound. For example, sound plays to the user when the user, an electronic device, or a software program activates the graphical representation or the sound associated with the graphical representation.

Consider an example in which two users execute a mobile messaging software application. The first user sends the second user an animated emoji (or animoji) that when activated or executed says "Hello" to the second user.

Block 210 makes a determination as to whether the sound will play to the second user as binaural sound (BS) or one of mono sound and stereo sound. If the answer to this determination is "no" then flow proceeds to block 220, and if the answer to this determination is "yes" then flow proceeds to block 230.

By way of example, sound can localize to the listener as mono sound or stereo sound when the sound is not convolved and played to the listener with headphones, earphones, etc. Mono sound and stereo sound can also externally localize to speakers, such as speakers in a smartphone, stereo speakers in a room, etc. Alternatively, sound externally localizes to the listener when the sound is convolved into or captured as binaural sound or 3D sound. Binaural sound externally localizes outside or away from the head of the listener and is not required to localize to a physical object, such as a speaker. For instance, binaural sound can externally localize one or more meters away from a person at a location in empty space (e.g., where no speaker exists or no physical or tangible object exists). Binaural sound can also localize to physical objects that do not have an electronic speaker, such as localizing to a wall or a chair. Sound can also localize as a mix of binaural, mono, and stereo sounds, such as sound commencing as binaural sound then transitioning to stereo sound to the listener.

The determination of how sound will localize to the listener depends on one or more of several factors. Examples of these factors include, but are not limited to, whether the listener is wearing headphone, earphones, or another electronic device that provides binaural sound, whether the listener is hearing the sound from multiple speakers that provide binaural sound (such as two speakers with cross-talk cancellation), whether the sound was or can be convolved with head-related transfer functions (HRTFs) or other transfer functions or impulse responses, whether the listener authorized binaural sound to play to the listener, and whether the listener is located at a geographical location (indoor or outdoor) that allows binaural sound.

For example, if the listener is not wearing headphones, earphones, or another electronic device that provides binaural sound, then the sound will localize as mono sound or stereo sound. Alternatively, the listener may be wearing such an electronic device but this electronic device is off, muted, or not in communication with the electronic device providing the sound.

As another example, if the sound is mono sound or stereo sound and not subsequently convolved with HRTFs or other sound localization information (SLI), then the sound will not externally localize as binaural sound. For instance, a user receives a graphical representation and sound recorded in mono or stereo sound. The sound is intended to play to the user as binaural sound, but the electronic device providing the sound does not have HRTFs of the user in order to convolve the sound into binaural sound.

As another example, a user receives a graphical representation and sound captured or recorded in binaural sound. The user is wearing headphones and can hear the sound as binaural sound. The electronic device of the user, however, is set to only play sound as mono or stereo sound. For instance, a permission for binaural sound is set to off, or the user has not authorized binaural sound to play with the current executing software application.

As another example, a user is at a location that restricts or prohibits the use of binaural sound. For instance, the user is located in a school, library, government building, or airplane that prohibits listeners from communicating with binaural sound.

Block 220 states display the graphical representation to the second user with no indication or an indication the sound is provided as mono or stereo sound.

For example, a default setting is sound plays as one of mono sound or stereo sound when the electronic device provides no visual indication. For example, if the user sees no visual indication, then the user assumes that the sound will be stereo sound or mono sound.

The graphical representation can include a visual indication showing that the sound will play as mono sound or stereo sound. When the user sees this visual indication, the user knows the sound will be stereo sound or mono sound.

Consider an example in which words, symbols, or another indicia are used to visually inform the user that the sound will be stereo or mono sound. For example, one of the following words display to the user: "mono" or "M" or "MS" to indicate mono sound, "stereo" or "S" to indicate stereo sound. These indications can be provided with other examples discussed herein.

Block 230 states display the graphical representation to the second user with (1) an indication as to how sound will localize and/or (2) an indication where the sound will externally localize as binaural sound to the second user.

By way of example, the graphical representation displays to the user with an indication as to how or where sound will localize. For instance, graphical representations display with an indication that sound the listener is hearing or is going to hear will be one of mono sound, stereo sound, and binaural sound. This indication can include visual or audio information that informs or instructs the user where the sound will localize with respect to the head or body of the second user or with respect to another location.

Consider an example in which these indications visually inform the user using one or more of text, color, brightness, shading, flashing or dimming of light, words, symbols, drawings, characters, photos, images, or other indicia or other examples discussed herein. For instance, the indication includes the word "stereo" or "mono" a symbol that the user recognizes or associates with stereo sound or mono sound.

In another example embodiment, the graphical representation displays to the user with no indication as to how or where sound will localize. For instance, graphical representations display with a default understanding that sounds will be provided as mono sound, stereo sound, or binaural sound. In this instance, an additional indication is not required since the listener knows that unless otherwise instructed or informed, the sound associated with the graphical representation will play as mono sound, stereo sound, or binaural sound.

Consider the example in which the first user sends the second user the graphical representation shaped as the word "WOW." While the second user wears wireless earphones, a symbol of "3D" displays immediately below the word "WOW" so the second user visually knows the sound will be in 3D. When the second user removes his or her earphones, the symbol of "3D" immediately disappears from the display since the sound can no longer externally localize to the second user as binaural sound without the earphones. When the second user reconnects or puts the earphones back on, the symbol of "3D" immediately reappears back onto the display.

Consider an example during an electronic communication in which a first user sends a second user a talking 3D animated, moving emoji that says "How are you?". This emoji appears on the display of the smartphone of the second user and flashes which indicates to the second user that the emoji has a sound clip or voice message waiting to be heard. The letters "3D" also flash with the emoji and indicate that the sound is available as 3D sound. The second user dons headphones, activates the emoji, and hears the recorded audio saying "How are you?" that externally localizes as binaural sound in empty space that is one meter away from the head of the second user.

Consider an example in which one or more electronic devices alter, change, update, or provide an appearance of a graphical representation based on how the sound is or will be provided to the listener or how the listener is or will localize the sound. For example, two or more user exchange or transmit graphical representations to electronic devices of each other. These graphical representations play sound to the users.

In this example, a first electronic device of a first user transmits the graphical representation and/or the sound to a second electronic device of the second user. The first and second electronic devices have, for example, wireless transmitter/receivers that enable them to wireless transmit the graphical representations and/or sound.

The second electronic device determines whether the sound can be provided to the second user as binaural sound. For example, the second electronic device determines one or more of (1) whether the headphones or earphones are powered on, (2) whether the headphones or earphones are in communication with the first electronic device providing the graphical representation and/or sound, (3) whether the second user is wearing the headphones or earphones, (4) whether the sound is binaural sound (e.g., captured as binaural sound or already convolved into binaural sound), and (5) whether HRTFs to convolve the sound are available (e.g., stored in memory or otherwise retrievable).

When the sound cannot be provided as binaural sound, the second electronic device displays the graphical representation with one or more of no indication of how the sound will localize, with an indication that the sound will localize as mono or stereo sound, with an indication that the sound will localize to an external physical speaker, or with an indication that the sound will localize inside the head of the second user.

When the sound can be or will be provided as binaural sound, the second electronic device displays the graphical representation with one or more of an indication of how the sound will localize, with an indication that the sound will localize as binaural sound or 3D sound, or with an indication that the sound will localize outside the head of the second user (e.g., to a location in empty space or a location with no speaker).

The second electronic device displays the graphical representation and/or indication to visually inform the second user how the sound is being provided or will be provided and/or where the sound will localize to the second user. This information enables the second user to quickly determine if the sound will be heard in a conventional manner (e.g., as mono or stereo) or in an unconventional manner in binaural sound. In this way, the second user will not be startled or surprised to hear binaural sound. Additionally, the second user will be informed to wear headphones or earphones before listening to the sound accompanying the graphical representation so the effects of external localization of binaural sound are not lost.

As discussed herein, example embodiments include various ways in which the graphical representation and/or a visual indication notifies the listener that the sound will be binaural sound and/or where the sound will localize to the listener. This information includes one or more of the following: (1) adding a symbol "3D" to the display, to the graphical representation and/or to the indication, (2) adding one or more words that when read by the listener provide the indication that visually informs the listener that the sound will externally localize as the binaural sound away from the head of the listener, (3) flashing the graphical representation and/or the indication, (4) changing a brightness of the graphical representation and/or the indication, (5) turning on and off the graphical representation and/or indication, (6) changing a shape or size of the graphical representation and/or indication (7) changing the graphical representation and/or indication from 2D to 3D or from 3D to 2D, and (8) executing other examples are discussed herein.

The electronic device also removes the indication when the determination is made that the sound is no longer or can no longer be provided as binaural sound. For example, the electronic device removes the "3D" (or another graphical representation and/or indication discussed herein) being displayed in response to determining that the headphones or the earphones of the listener are not connected to the second electronic device, not powered on, not connected to the network, not being worn by the listener, muted or silenced, etc.

FIG. 3 is a method to convolve sound into binaural sound when the listener will hear the sound as binaural sound in accordance with an example embodiment.

Block 300 states receives a graphical representation and/or sound to play to the listener.

For example, an electronic device receives the graphical representation and/or sound during an electronic communication. The electronic device receives the sound from memory, from another electronic device, from a network, from a server, as streaming audio, etc.

Block 310 makes a determination as to whether the sound will play to the second user as binaural sound.

If the answer to the determination in block 310 is "no" then flow proceeds to block 320 that states play the sound to the listener in mono sound or stereo sound.

For example, the sound plays through headphones or earphones as mono sound or stereo sound. As another example, the sound plays through one or more speakers in a wearable electronic device (WED) or a handheld portable electronic device (HPED) as mono sound or stereo sound. For instance, the sound emanated from a speaker in a smartphone or speaker in a laptop.

If the answer to the determination in block 310 is "yes" then flow proceeds to block 330 that states process or convolve the sound with head-related transfer functions (HRTFs) so the sound will externally localize as binaural sound to the listener.

For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

One example embodiment processes or convolves the sound with the HRTFs before the electronic communication commences or before a point in time when the sound is requested for play during the electronic communication. For example, process the sound before the graphical representation is activated. This expedites playing of the sound to the listener since the listener does not have to wait while a processor processes or convolves the sound into binaural sound. Furthermore, the processor (such as the DSP) can be devoted to other tasks instead of convolving the sound into binaural sound.

Another example embodiment processes or convolves the sound during the electronic communication or at a point in time when the sound is requested for play in the electronic communication. For example, the DSP convolves the sound when the graphical representation activates.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

In one example embodiment, the DSP is located in the electronic device of the second user. In other example embodiments, the DSP is located in other electronic devices, such as a server or in the first electronic device of the first user.

The DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound.

HRTFs can be obtained from actual measurements (e.g., measuring HRIRs and/or BRIRs on a dummy head or human head) or from computational modeling. HRTFs can also be general HRTFs (also known as generic HRTFs) or customized HRTFs (also known as individualized HRTFs). Customized HRTFs are specific to an anatomy of a particular listener. Each person has unique sets or pairs of customized HRTFs based on the shape of the ears or pinnae, head, and torso.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates $(r, \theta, \phi)$ for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including $r, \theta, \phi$) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°.

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location $(\theta, \phi)$ with discrete Fourier transforms (DFTs) calculated for the left and right ears. The ITD is located at the point for which the function attains its maximum value, known as the argument of the maximum or arg max as follows:

$$ITD = \mathrm{argmax}(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at $(r, \theta, \phi)$. Such sounds include filtering stereo and monaural sound to localize at $(r, \theta, \phi)$. For example, given an input signal as a monaural sound signal $s(n)$, this sound is convolved to appear at $(\theta, \phi)$ when the left ear is presented with:

$$s_l(n)=s(n-ITD) \cdot d_{l,\theta,\phi}(n);$$

and the right ear is presented with:

$$s_r(n)=s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal $x(t)$ is convolved with a linear filter of an impulse response $h(t)$ to generate an output signal $y(t)$ as follows:

$$y(\tau) = x(\tau) \cdot h(\tau) = \int_0^\infty x(\tau-t) \cdot h(t) \cdot dt.$$

This reduces to a summation when the impulse response has a given length N and the input signal and the impulse response are sampled at $t=iDt$ as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is pre-processed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Block 340 states play the binaural sound to the listener so the sound externally localizes outside the head of the listener.

The sound plays to the listener as binaural sound that externally localizes away from or outside of the head of the listener. For example, headphones or earphones provide this sound at one or more sound localization points (SLPs) discussed herein.

Consider an example in which a listener receives sound to play, such as a recorded voice message, a sound clip, or streaming audio. The electronic device receiving the sound makes a determination as to whether the sound can play to the listener as binaural sound. For example, the listener can hear binaural sound when the headphones or earphones are powered on, being worn, and receiving the sound. In response to this determination, the electronic device processes or convolves the sound from mono sound or stereo sound into binaural sound and plays the binaural sound to the listener.

An example embodiment saves processing resources. For example, the electronic device starts and stops convolution of the sound based on the determination of whether the binaural sound can be provided to the listener. For instance, the electronic device continues to convolve the sound as long as the listener hears the sound as binaural sound. The electronic device stops convolving the sound when the listener is no longer able to hear binaural sound. At this time, the listener may still be able to hear the sound as mono sound or stereo sound.

Consider an example in which the listener listens to streaming audio while wearing a WED (e.g., headphones, earphones, a head mounted display, or electronic glasses that provide augmented reality (AR) images). During the time that the listener wears the WED, a processor convolves the sound into binaural sound and plays the binaural sound to the listener. When the listener removes the WED, the output location of the sound switches to one or more speakers that emit the sound into the room or location of the listener, as opposed to emitting the sound directly into the ears of the listener through headphones or earphones. At this time, the listener is no longer able to externally localize the sound as binaural sound since he or she no longer wears the WED. The sound, however, does not stop or is not interrupted. Instead, the sound continues to play to the listener (e.g., a speaker in the WED, a speaker in a smartphone, speakers on the floor of a room, etc.). When the listener removes the WED, the processor ceases or stops convolving the sound into binaural sound since the listener is no longer able to hear binaural sound at this time. This process save processing resources since, for example, the DSP is no longer required to process sound with HRTFs.

Consider an example in which the listener wears headphones that communicate with a smartphone that provides audio to the headphones. While the listener wears the headphones, the listener hears the audio as binaural sound. For instance, a DSP in the smartphone processes the sound into binaural sound that plays to the listener. The binaural sound, however, ceases to play to the listener when the listener takes the headphones off, turns them off, or unplugs or physically or wirelessly disconnects them from the smartphone. At this moment in time, the output of the sound switches from being provided through the headphones to being provided through one or more speakers in the smartphone. The audio is not interrupted as the listener continues to hear the sound. In response to this determination, a DSP stops convolving the sound into binaural sound since the listener is not able to hear binaural sound from the small speakers in the smartphone. In this way, the sound is not unnecessarily convolved. When the listener commences to listen to the sound again through the headphones, convolution of the sound resumes. Thus, for example, the action of connecting and disconnecting the headphones, causes convolution to start and to stop in response to the connecting and the disconnecting.

Graphical representations include, but are not limited to, emoji, emoticons, animoji, icons, stickers, folders, documents, files, text or words, pictures, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

The indication enables a user to see that sound associated with or corresponding to the graphical representation will externally localize as binaural sound or one of mono sound or stereo sound and/or a location where the sound will localize to the listener. For example, the user knows in advance that the sound will externally localize as binaural sound in empty space one meter away from the head as opposed to hearing the sound as stereo sound or mono sound that internally localizes inside a head of the user. Before the user actually hears the sound associated with the graphical representation, the user knows that the sound is binaural sound and intended to externally localize outside of the head of the user.

The indication can also inform or instruct the user to wear headphones, earbuds, earphones, or another electronic device that provides binaural sound. Binaural sound cannot accurately localize outside a head of the listener unless the listener wears such an electronic device. Since the listener knows in advance that the sound is binaural sound, he or she will don headphones or earphones before listening to the sound if the listener is not already wearing such a device.

The indication can be part of the graphical representation itself. For example, the indication forms part of the structure or body of the graphical representation. The indication can also attach to the graphical representation or touch, supplement, compliment, or complete the graphical representation. Alternatively, the indication is separate from or apart from the graphical representation. For example, the indication and the graphical representation are two different and/or separate objects that are simultaneously displayed to the user.

Figure 4A:
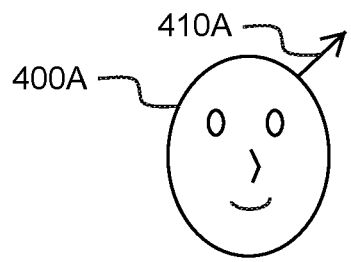
FIG. 4A is a graphical representation with an indication of binaural sound in accordance with an example embodiment.

By way example, the indication is or uses color, light, brightness, shading, or another enhancement or indication to visibly show the user that sound associated with the graphical representation will be played in and heard by the listener as binaural sound. Further examples of indications are shown in FIGS. 4A-4X.

In an example embodiment, a sound file, sound clip, streaming sound, a recording, or other type of sound associates with or corresponds to a graphical representation. Binaural sound plays to the listener when the graphical representation activates.

In an example embodiment, a user, a listener, a program or software application, or an electronic device activates the graphical representation and/or causes the binaural sound to play to the listener.

For example, the listener interacts with a user interface and provides a command or instruction to play the sound upon receiving the graphical representation. For instance, the first user performs one or more actions that include, but are not limited to, clicking or activating an icon, emoji, graphical representation, or other indicia that represents a sound clip, sound file, streaming sound, or recording, selecting the sound from a menu (such as a dropdown menu), selecting the sound from a folder or file (such as a folder or file being displayed to the first user), providing a body gesture (such as a hand gesture or hand movement indicating a desire to play the sound), providing head movement or eye movement (such as the listener moving his or her head in a certain direction or pattern to indicate selection of the sound), providing a voice command (such as the listener speaking an instruction at a natural language user interface), or taking another action to have the sound played to the listener.

As another example, the sound automatically plays. For instance, the sound plays when the listener receives the graphical representation, opens the software program providing the graphical representation, or views the graphical representation on a display.

As another example, the sound plays when a sender of the sound (e.g., another user in an electronic communication with the listener) activates the sound or designates when the sound plays.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is altered or convolved and provided to the listener so the sound appears to originate from the sound source or SLP.

In an example embodiment, at least a portion of the sound associated with, corresponding to, or provided from the graphical representation externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

Consider an example in which two users message and/or talk to each other in an electronic communication via a mobile messaging application. A HPED of the first user sends a HPEP of the second user a graphical representation, here a 3D sound emoji or animoji. This emoji appears on the display of the HPED of the second user as an animated or cartoon character. This character wears headphones that flash or change brightness. When the second user sees the headphones, he or she knows the emoji is informing the second user to wear headphones or earphones before listening to the sound associated with the emoji. The second user dons headphones, and the emoji (here the character) speaks. A voice of the emoji externally localizes as binaural sound to the listener at a SLP outside of the head of the second user. Once the user dons the headphones, the headphones disappear since this indication served its function to inform the user that sound would be binaural sound.

An example embodiment displays the graphical representation with an indication visually informing a listener a location where binaural sound associated with the graphical representation will externally localize to the listener.

The indication shows the user the location of the sound source or SLP where the binaural sound will originate to the listener. This location can be a physical or virtual object, a point, an area, or a direction. Further, the indication can provide the location with a precise or general direction of the SLP and/or a precise or general distance to the SLP.

In an example embodiment, the indication provides a precise, exact, or clearly identifiable location where the sound will originate to the listener. For example, the indication displays, provides, or points to a SLP that is a precise point or area that the listener can identify or see. For example, the indication indicates a physical or virtual object where the sound will externally localize. When the listener hears the sound, the sound indeed originates from the physical or virtual object identified by the identification.

In an example embodiment, the indication provides a general point, general area, or direction where the sound will originate to the listener. For example, the indication provides a heading or direction (e.g., North, South, East, West, etc.). As another example, the indication provides general direction or area (e.g., sound will originate to your left, to your right, in front of you, over there, behind you, etc.).

The indication can also provide a precise or general distance to the location. For example, upon seeing the indication, the listener knows the SLP will be one meter away or two meters away. As another example, upon seeing the indication, the listener knows the SLP will be near to the listener (e.g., within 3 meters) or far from the listener (e.g., greater than five meters, greater than 10 meters, or farther). Alternatively, the indication identifies whether the SLP will be "near-field" (which is sound that originates from a location that is within one meter from a head of the listener) or "far-field" (which is sound that originates from a location that is greater than one meter from the head of the listener).

As another example, the listener knows the specific direction from where the sound originates but not the precise distance to the sound. As another example, the listener knows a specific distance but not the location. For instance, the listener hears a voice and knows the voice originates about 2 meters behind the left side of the head of the listener.

By way of example, the SLP can be an actual point in space (e.g., an empty point in space 1-2 meters away from the head of the listener) or a point on a physical or virtual object (e.g., a mouth or head of an augmented reality (AR) or virtual reality (VR) image). The SLP does not have to be so precise since humans are not always able to localize sound to a particle point. As such, the SLP can also be a general area (e.g., a location next to and on the right side of the listener) or a general direction from where the sound originates to the listener (e.g., a location several meters behind the listener).

In an example embodiment, the listener hears the sound associated with the graphical representation as binaural sound that externally localizes away from the head of the listener to the location indicated by indication.

The listener hears the sound at the location that coincides with or matches with the location provided by the indication. In this way, the listener knows in advance where the binaural sound will externally localize to the listener before the listener hears the sound.

Consider an example in which the graphical representation is an emoji that includes a talking animated animal head or human head. When a listener clicks on or activates the emoji, the head talks and the listener hears the voice as binaural sound that externally localizes about one meter away from the listener. The emoji includes an indication showing that this voice will externally localize in front of and to the right of the head of the listener. For instance, the voice is convolved with head-related transfer functions (HRTFs) having spherical coordinates (distance $r=1.0$ m, elevation $\phi=0°$, azimuth $\theta=30°$). The listener activates the emoji and hears the voice originate from spherical coordinates (1.0, 0°, 30°) which coincides with the location indicated by the indication.

Consider another example in which the graphical representation is an emoji that displays on a HPED of the listener. The emoji appears in the center of the display of the HPED, and a flashing dot (or other flashing indicia) appears above and to the left of the emoji. This dot indicates the location where the binaural sound will localize with respect to the listener. In this example, the emoji represents or symbolizes the head of the listener, and the dot represents a relative location where the SLP will be. As shown on the display of the HPED, the SLP (shown as the flashing dot) is in front of and to the left of the emoji. As such, the SLP for the sound that the listener will hear will also occur in front of and to the left of the head of the listener.

An example embodiment displays the graphical representation that informs a listener to wear headphones or earphones before listening to binaural sound in accordance with an example embodiment. The indication visually informs the listener to wear headphones or earphones so the listener knows in advance that sound associated with the graphical representation will externally localize as binaural sound to the listener when the sound plays to the listener. In this way, the effects of externally localization are not lost, and the listener is able to enjoy 3D sound as opposed to hearing the sound as stereo sound or mono sound.

By way of example, the indication uses one or more of color, light, shading, brightness, or flashing to inform the listener to wear headphones or earphones before listening to the sound. As another example, the indication uses words or text to inform the user. For instance, the indication includes the words "headphones" or an acronym or symbol (e.g., "HP" or "3D") to signify the listener should wear headphones or earphones. As another example, the graphical representation includes a sign, symbol, emblem, artwork, image, or other indicia showing the listener to wear headphones or earphones. For instance, the graphical representation includes a head wearing headphones, about to wear headphones, or putting on headphones. Movements or actions of the graphical representation instruct the listener on what movements or actions the listener should do as well (e.g., movements of the graphical representation donning headphones shows the listener to don headphones).

During an electronic communication, one or more users exchange graphical representations, indications, and/or sound with each other.

By way of example, a computer or electronic device generates the sound (computer-generated sound), or microphones capture and record the sound to be sent. For example, one or more microphones capture the sound as mono sound or stereo sound when the first user speaks a message to the second user. As another example, the first electronic device or a server in communication with the first electronic device includes a plurality pre-recorded or previously generated sounds.

The sound can be stored in memory of an electronic device, obtained from memory of an electronic device (such as a computer or server), and/or transmitted or streamed over one or more networks.

Consider an example in which the first electronic device executes a mobile software messaging application that includes hundreds or thousands of sound clips or sound files. The first electronic device obtains or has access to these sound clips or sound files and can send them to other users of the mobile software messaging application.

Consider an example in which the first electronic device obtains the sound when the first user speaks into microphones in the first electronic device or in communication with the first electronic device. The microphones records the voice of the first user as he or she records a message or sound to be played to the second user.

The first electronic device transmits the sound and a graphical representation associated with or corresponding to the sound over one or more wired or wireless networks (e.g., a cellular network, the internet, etc.). For example, the first electronic device includes a wireless transmitter/receiver that sends the sound and graphical representation.

Consider an example in which the first user commands or instructs the sound clip to play to the second user during an electronic communication between the first and second users. In response to this command or instruction, the first electronic device transmits the sound clip and a 3D moving emoji to the second electronic device.

In another example embodiment, a server or another electronic device transmits the sound and/or graphical representation to the second electronic device. Consider an example in which the first and second users talk or message each other with a mobile messaging software application. The application executes on the electronic devices and one or more servers. When the first user clicks on a 3D sound emoji, this action causes one of the servers to transmit the 3D emoji and sound to the second electronic device.

The second electronic device receives the sound and the graphical representation from the first electronic device or another electronic device (e.g., a server) in communication with the first electronic. For example, the second electronic device includes a wireless transmitter/receiver that receives the sound and graphical representation over one or more networks.

A processor or sound hardware processes or convolves the sound with head-related transfer functions (HRTFs) or other SLI so the sound will externally localize as binaural sound to the listener.

In an example embodiment, the electronic device display the graphical representation with one or more of the following: (1) an indication that the sound will externally localize as binaural sound to the second user, (2) an indication of a location where the sound will externally localize as binaural sound to the second user, and (3) an indication informing the second user to wear headphones or earphones before listening to the sound.

The graphical representation displays one or more indications discussed herein in accordance with example embodiments. These indications include those discussed in connection with FIGS. 4A-4X.

FIGS. 4A-4X show a plurality of graphical representations with one or more indications in accordance with example embodiments. By way of example, the graphical representations 400A-400X are shown as faces, such as a face of an emoji, emoticon, etc. Such faces can have many shapes and forms, such as human faces, cartoon character faces, animal faces, animated faces, etc.

Example embodiments are not limited to graphical representations that include faces, such as those shown in FIGS. 4A-4X. Graphical representations can have many sizes, shapes, and forms (e.g., people, faces, characters, animals, and objects).

Furthermore, these graphical representations are shown as two-dimensional but can also be three-dimensional (3D). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations 400A-400X include or are associated with a sound, such as a sound clip, a sound file, a recorded voice message, streaming audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users.

By way of example, the sound plays when the listener activates the graphical representation or another action occurs that initiates or activates playing of the sound. For example, a first user sends a second user an emoji shaped like a heart. This heart appears on a display of an electronic device of the second user. When the second user clicks on the heart, a voice in binaural sound says "I love you" to the second user.

With example embodiments, the graphical representations can represent or symbolize the listener or source of sound (depending on what instructions or understandings are provided to the listener and/or users). The graphical representations and indications are displayed to the listener on a display of a WED, PED, HPED, HMD, or other electronic device discussed herein. The electronic device and display are not shown in FIGS. 4A-4X for ease of illustration. Further, these figures are shown from the point-of-view of the listener looking at the display and/or interacting with the electronic device.

As explained herein, the graphical representation and/or indication can be altered or changed in response to determining how the sound will play to the listener or how the listener will hear the sound (e.g., hear the sound as binaural sound or one of mono sound or stereo sound). For example, the indication is added or removed from the graphical representation in response to this determination.

Consider an example in which the graphical representation is originally sent or displayed as 400A-400X (e.g., without the indication). Upon determining how the listener will hear the sound or how the sound will localize, the graphical representation is altered to include the indication 410A-410X. The indications can be added and removed as discussed herein.

FIG. 4A shows a graphical representation 400A with an indication 410A shown as an arrow or pointer. One end of the arrow connects to the head of the graphical representation, and another end of the arrow points to a location where binaural sound will externally localize to the listener. Indication 410A points upward and to one side of the face of the graphical representation. This location shows the listener where the binaural sound will externally localize to the listener when the binaural sound plays to the listener.

Consider an example in which the graphical representation 400A displays on a display in front of the listener and represents a person or character that will talk to the listener. For example, the listener holds a smartphone or wears a HMD or WED, and the display shows the graphical representation 400A in front of the face of the listener. In this instance, the arrow points to a location in space that is upward and to the right of the listener. When the listener activates the graphical representation, the sound externally localizes to the location indicated with the indication 410A (here, upward and to the right of the face of the listener).

Consider an example in which the arrow is colored (e.g., blue or another color) and/or flashes or changes brightness. When users sees this arrow, they know that sound associated with the corresponding graphical representation will externally localize as binaural sound. This arrow appears on other emoji or emoticons. Users recognize the arrow as an indication or message that the sound will be in binaural sound.

The indications can thus serve as a way to visually inform users that the sound associated with the graphical representation will be binaural sound. Users learn the recognize the indication as a symbol for binaural sound. When a listener sees the arrow, he or she immediately knows in advance that the sound will be binaural sound and externally localize, as opposed to mono sound or stereo sound that internally localizes inside a head of the listener.

Figure 4B:
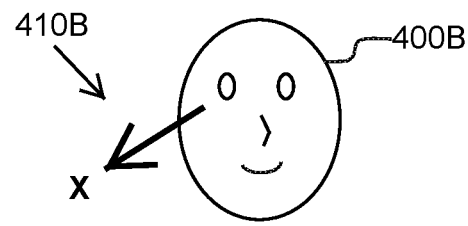
FIG. 4B is a graphical representation with an indication of binaural sound in accordance with an example embodiment.

FIG. 4B shows a graphical representation 400B with an indication 410B. The indication includes a pointer or arrow having one end near or adjacent to eyes of the head of the graphical representation, and another end of the arrow points to a location in empty space (marked with an "X") that is next to one side of the head or the face of the graphical representation. This location at the "X" indicates where binaural sound will externally localize to the listener. The arrow also indicates to the listener to look in this direction since this direction is where the sound will externally localize once played. The indication thus shows the listener which direction to look or to face so the listener looks at the SLP when the binaural sound activates and plays to the listener.

Consider an example in which the graphical representation 400B displays through a HMD that the listener wears. The graphical representation does not initially display the indication 410B. Binaural sound will externally localize at a SLP having spherical coordinate location (1.0, 0.0°, −30°) with respect to the head of the listener as an origin. The sound is about to play, but the listener is looking in a different direction, such as looking at an object at (3.0, 10°, +44°). The listener is thus not current looking at or facing the SLP. In response, the HMD flashes the indication 410B on the display. The indication informs the listener that binaural sound is about to play. The indication also informs the listener to move his or her head in a direction show by the arrow since the sound will externally localize. The listener moves his or her head until the "X" is in his or her field-of-view. When this occurs, the HMD removes the indication 410B and plays the binaural sound as an animated 3D VR talking human character.

Figure 4C:
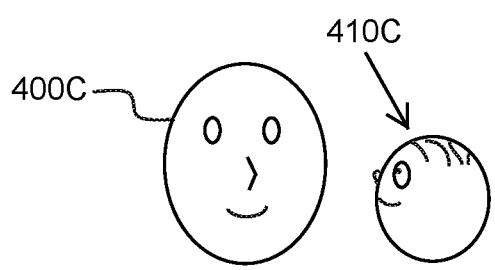
FIG. 4C is a graphical representation with an indication of binaural sound in accordance with an example embodiment.

FIG. 4C shows a graphical representation 400C with an indication 410C shown as head of a person. The indication and the graphical representation together show where the binaural sound will externally localize to the listener before or while the sound plays to the listener.

Consider an example in which a first user and a second user talk or exchange talking graphical representations during an electronic communication. The first user sends the second user a talking emoji shown as 400C which displays to the second user on a HPED. This emoji is an animated head that looks like or represents the first user. So, the face of the first user appears on the display of the HPED of the second user and faces the second user as shown in FIG. 4C. The indication 410C also appears on this display and represents the head of the second user. So, the second users sees himself or herself (indication 410C) talking to the first user (graphical representation 400C). The relative position of graphical representation 400C to indication 410C clearly shows that the first user is located in front of and to the left of the second user. In other words, the relative position of the two heads on the display of the HPED show where the SLP will be for the second user.

Figure 4D:
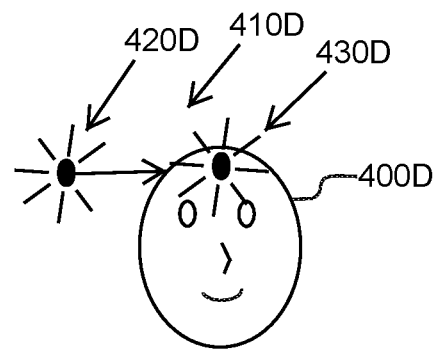
FIG. 4D is a graphical representation with an indication of binaural sound in accordance with an example embodiment.

FIG. 4D shows a graphical representation 400D with an indication 410D shown as source of binaural sound (a black dot with lines emanating from the black dot). As shown with an arrow, the source of binaural sound moves from a first location 420D outside a head of a person to a second location 430D inside a head of the person.

The indication 410D provides the listener with a variety of different valuable information. Consider the example in which the graphical representation 400D represents or symbolizes the head of the listener and is shown on a display of an HPED to the listener. First, the indication shows the listener that the sound will be binaural sound since the location 420D is physically located outside of the head of the listener. Second, the indication shows a location of where this binaural sound will initially localize to the listener. As shown, the binaural sound initially has a SLP to a right side of the face of the listener. The indication shows transition or movement of the binaural sound. The SLP starts at 420D and moves along the arrow to 430D. Here, the sound initially localizes as binaural sound and then moves to internally localize as stereo or mono sound.

Figure 4E:
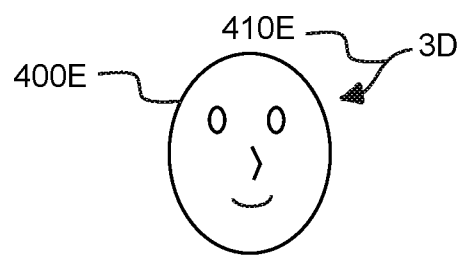
FIG. 4E is a graphical representation with an indication of binaural sound in accordance with an example embodiment.

FIG. 4E shows a graphical representation 400E with an indication 410E that includes a curved pointer or arrow. One end of the arrow points to the head or ears of the face of the graphical representation, and another end of the arrow includes a "3D" that indicates three-dimensional sound.

The indication 410E shows the listener that the sound will or is localizing in binaural sound. The indication also a direction to the source of the sound that is located at the "3D." Furthermore, a size of the "3D" can indicate a distance to the source of the sound. For example, different font sizes represent different distances. For instance, a "3D" with a larger size indicates the source of sound is closer than a "3D" with a smaller size.

Figure 4F:
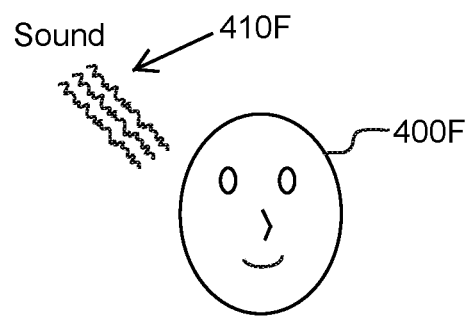
FIG. 4F is a graphical representation with an indication of binaural sound in accordance with an example embodiment.

FIG. 4F shows a graphical representation 400F with an indication 410F that shows the sound will externally localize to the listener as binaural sound. The indication includes the word "Sound" and sound waves entering from one side of the head of the graphical representation.

Consider an example in which the graphical representation 400F represents or symbolizes the head of the listener. In this instance, the source of sound originates from a right side located above the head of the listener.

Figure 4G:
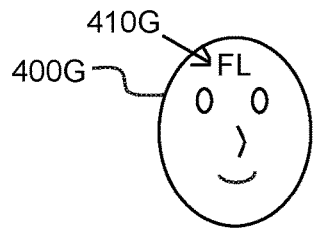
FIG. 4G is a graphical representation with an indication of binaural sound in accordance with an example embodiment.

FIG. 4G shows a graphical representation 400G with an indication 410G that shows the sound will externally localize to the listener as binaural sound. The indication includes the acronym or letters "FL" that stand for "front left." Based on this indication, the listener expects the source of sound to be in front of the face of the listener and to his or her left.

The location of the source of binaural sound can appear inside the body of the graphical representation with words, text, symbols, images, or other indicia that indicate a direction and/or distance to the source of the sound. For example, instead of "FL" the indication includes a compass heading (such as North, South, East, or West) or a coordinate location (such as coordinate location in rectangular coordinates, polar coordinates, or spherical coordinates).

Figure 4H:
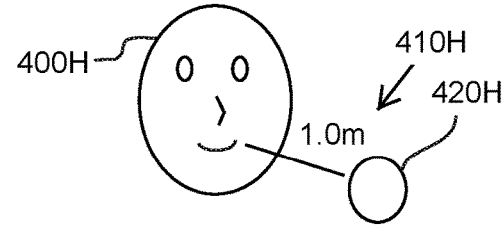
FIG. 4H is a graphical representation with an indication of binaural sound in accordance with an example embodiment.

FIG. 4H shows a graphical representation 400H with an indication 410H. The indication includes a SLP or source of sound 420H with respect to the graphical representation 410H. The indication shows a distance (1.0 meter) from the graphical representation to the source of sound. This distance shows the listener that the binaural sound will externally localize one meter away from the head of the listener.

In an example embodiment, the indication remains displayed with the graphical representation. For instance, while the graphical representation displays to the listener, the indication simultaneously displays to the listener. In another example embodiment, the indication displays for a temporary period of time with the graphical representation. For instance, the indication initially displays with the graphical representation to notify or inform the user of the existence and location of the source of the binaural sound. The indication then disappears while the graphical representation continues to display to the listener while the sound plays to the listener.

Figure 4I:
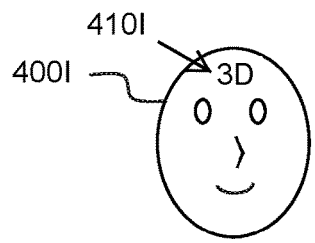
FIG. 4I is a graphical representation with an indication of binaural sound in accordance with an example embodiment.

FIG. 4I shows a graphical representation 400I with an indication 410I that shows the sound will externally localize to the listener as binaural sound. The indication includes the acronym or letters "3D" that stand for three-dimensional. Based on this indication, the listener expects the sound to be 3D sound or binaural sound that externally localizes to the listener.

Consider an example embodiment in which the indication is instead "Mono" or "Stereo" or another symbol or word to visually indicate that the sound will localize as or be provided as mono sound or stereo sound.

Figure 4J:
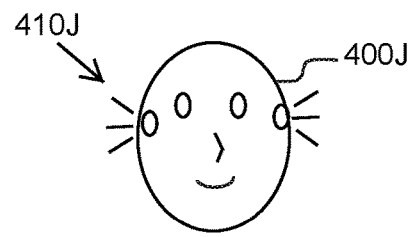
FIG. 4J is a graphical representation with an indication of binaural sound in accordance with an example embodiment.

FIG. 4J shows a graphical representation 400J with an indication 410J that shows the face with ears and sound (shown as three lines) emanating into the ears. This information informs the listener to wear headphones and informs the listener that sound is or will be binaural sound that externally localizes away from the head of the listener.

Figure 4K:
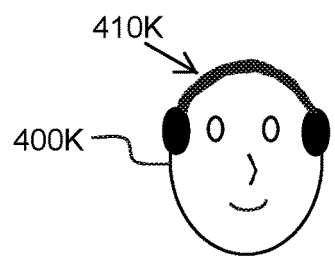
FIG. 4K is a graphical representation with an indication of binaural sound in accordance with an example embodiment.

FIG. 4K shows a graphical representation 400K with an indication 410K that includes headphones on the head of the face of the graphical representation. This indication informs the listener to wear or don headphones before listening to the sound.

Consider an example in which a first user sends a second user a 3D image that talks to the second user. When the second user activates the 3D image, a sound clip plays to the listener as binaural sound that externally localizes away from the head of the second user. The 3D image is or represents the first user. For instance, this image looks like or resembles the first user. This 3D image includes the first user wearing headphones. When the second user sees the image of the first user wearing headphones, the second user is reminded or instructed to wear headphones before listening to the sound clip. When the user puts on headphones and the sound clip begins to play, the headphones disappear from the 3D image.

Figure 4L:
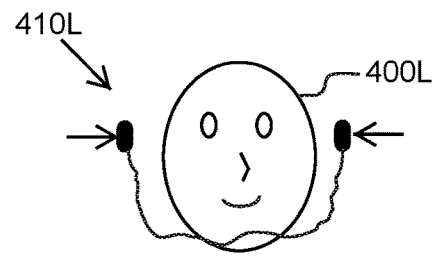
FIG. 4L is a graphical representation with an indication of binaural sound in accordance with an example embodiment.

FIG. 4L shows a graphical representation 400L with an indication 410L that instructs a listener to wear earphones or earbuds before listening to the sound associated with the graphical representation. This indication informs the listener to wear or don headphones before listening to the sound. Specifically, the indication shows the graphical representation putting on earphones or shows earphones being placed on the head of the graphical representation. This information reminds or instructs the listener to also put on earphones.

Consider an example in which a display of user simultaneously displays many graphical representations. Graphical representations with indications indicating 3D sound or binaural sound quickly show the user which ones of the graphical representations are in binaural sound or will play as binaural sound. Those graphical representations without such an indication are in stereo or mono sound or will play as stereo or mono sound. Providing such indications with emojis, for example, enables a listener to quickly visually determine a format of emojis with sound (e.g., a format of stereo or mono sound versus a format of binaural sound).

Figure 4M:
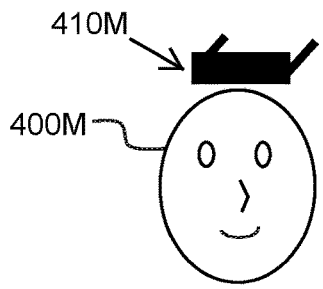
FIG. 4M is a graphical representation with an indication of binaural sound in accordance with an example embodiment.

FIG. 4M shows a graphical representation 400M with an indication 410M that instructs a listener to wear a head mounted display (HMD) or other wearable device (e.g., a smartphone that attaches to the head of the listener via a head mount). This indication informs the listener to wear or don the HMD before listening to the sound. Specifically, the indication shows the graphical representation putting on the HMD. This information reminds or instructs the listener to also put on his or her HMD.

Figure 4N:
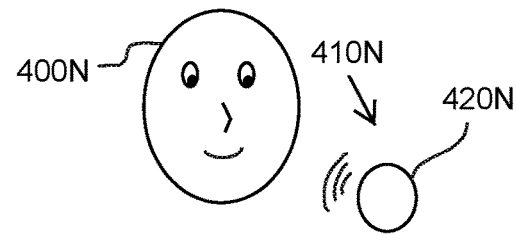
FIG. 4N is a graphical representation with an indication of binaural sound in accordance with an example embodiment.

FIG. 4N shows a graphical representation 400N with an indication 410N shown as a source of the binaural sound. The indication includes a circle that represents the source of sound or SLP from where the listener will hear the binaural sound. Three lines indicate sound emanating from the circle to the listener.

The graphical representation 400N also includes eyes that are looking toward the indication 420N. The direction of gaze of the graphical representation shows the listener the direction of the source of sound.

Consider an example in which two users send emojis with 3D sound to each other during an electronic communication. The graphical representation 400N is a 3D talking emoji of the first user that was sent to the HPED of the second user. Before activating the emoji, the second user sees eyes of the graphical representation looking forward but to one side. This same side includes source of sound emitting sound. This information instructs the second user that the sound will be 3D sound or binaural sound. The information also instruct the second user of the location where the second user will hear the sound. When the second user activates the emoji, its mouth moves and begins to talk to the second user. The indication 420N vanishes from the display, and the second user sees the graphical representation 400N talking.

Figure 4O:
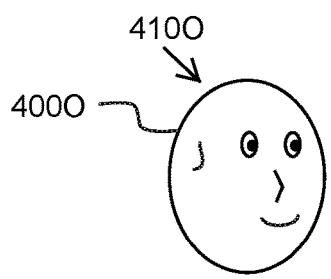
FIG. 4O is a graphical representation with an indication of binaural sound in accordance with an example embodiment.

FIG. 4O shows a graphical representation 400O with an indication 410O shown as eyes and face of the graphical representation looking in a particular direction. This direction indicates the location of the binaural sound to the listener.

The face of the graphical representation 400O is rotated to the right from the point-of-view of the listener. This information instructs the listener that the listener should look to his or her right. Alternatively or additionally, this information instructs the listener that the source of sound or SLP will be to the right of the head of the listener.

FIG. 4O shows that the looking direction or gaze of the eyes can indicate the location of the source of sound or SLP. The direction of the face or looking direction of the face can also indicate this information. For example, the head of the graphical representation 400O rotates to a right to indicate the SLP will be to the right, rotates left to indicate the SLP will be to the left, rotates up to indicate the SLP will be up, etc.

The graphical representation 400O also includes eyes that are looking toward the indication 420O. The direction of gaze of the graphical representation shows the listener the direction of the source of sound.

Figure 4P:
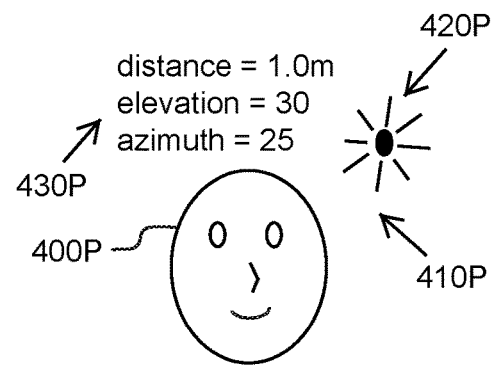
FIG. 4P is a graphical representation with an indication of binaural sound in accordance with an example embodiment.

FIG. 4P shows a graphical representation 400P with an indication 410P that includes a source of sound or SLP 420P and information 430P about the location of the SLP. The information shows a coordinate location where the SLP will or does exist for the listener. This SLP has a spherical coordinate location of (1.0 m, 30°, 25°).

In FIG. 4P, the indication 410P shows the precise or exact coordinate location where the sound will play to the listener. The SLP 420P is also positioned at this same location. So both the coordinate location (shown at 430P) and the SLP 420P show the listener where the sound will play to the listener.

Figure 4Q:
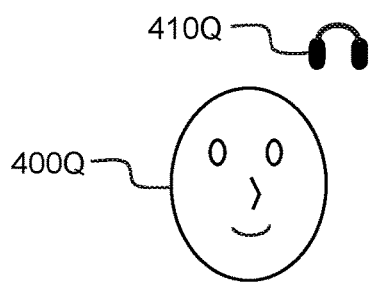
FIG. 4Q is a graphical representation with an indication of binaural sound in accordance with an example embodiment.

FIG. 4Q shows a graphical representation 400Q with an indication 410Q that includes headphones. These headphones serve one or more of several functions. First, the headphones instruct the listener to put on headphones. Second, the headphones instruct the listener that the sound the listener will hear will be binaural sound since proper external sound localization of binaural sound requires headphones or earphones. Third, the headphones show a location where the binaural sound will externally localize to the listener. As shown in FIG. 4Q, the sound will originate above and in front of the listener since this is the location of the headphones with respect to the head of the graphical representation.

Figure 4R:
FIG. 4R is a graphical representation with an indication of binaural sound in accordance with an example embodiment.

FIG. 4R shows a graphical representation 400R with an indication 410R that includes a facial expression of the graphical representation. The facial expression (shown as a sad face) indicates to the listener that the listener is not ready to hear the sound associated with the graphical representation.

Consider an example in which emojis with sad faces represent that the listener is not wearing headphones or earphones. When the listener dons headphones or earphones, the emoji with the sad face changes to a happy face. This change and the happy face signify to the listener that the listener is ready to hear the sound as binaural sound.

FIG. 4S shows a graphical representation 400S with an indication 410S. The indication includes three circles that represent SLPs near the head or face of the graphical representation which is understood to represent the head of the second user. Each circle represents a different SLP where the first user can select to have binaural sound externally localize away from the head of the second user. One SLP 412S appears in front of and on a right side of the head of the graphical representation (representing the head of the second user); one SLP 414S appears in front of and above the head of the graphical representation (representing the head of the second user); one SLP 416S appears in front of and on a left side of the head of the graphical representation (representing the head of the second user).

Consider an example in which the graphical representation 400S displays on or through an electronic device of the first user (e.g., a HMD, smartphone, or wearable electronic device). The first user selects one of the indications 412S, 414S, or 416S and transmits the graphical representation 400S to the second user during an electronic communication between the first user and the second user. When the electronic device of the second user receives the graphical representation, the sound plays as binaural sound to the location of the indication selected by the first user. For example, if the first user selected 412S, then the binaural sound originates in front of and to a right side of the head of the second user since the location of 412S displayed to the first user was in front of and to a right side of the head of the graphical representation 400S.

FIG. 4T shows a graphical representation 400T with an indication 410T. The indication represents a SLP or location where binaural sound will emanate with respect to the listener. The indication 410T is located in front of the face or head and shows a relative location where the binaural sound will originate. For example, the binaural sound will localize to a SLP that is in empty space about one meter away from the head or face of the listener as shown in FIG. 4T. HRTFs with coordinate locations of the indication are stored in memory and retrieved upon selection of the indication.

FIG. 4U shows a graphical representation 400U with an indication 410U. The indication includes three symbols ("3D") that represent three-dimensional or binaural sound. Each 3D symbol represents SLPs near the head or face of the graphical representation which is understood to represent the head of the second user. Each 3D symbol represents a different SLP where the first user can select to have binaural sound externally localize away from the head of the second user. One 3D symbol 412U appears in front of and slightly above the face of the graphical representation (representing the head of the second user); one 3D symbol 414U appears directly front of the face of the graphical representation (representing the head of the second user); one 3D symbol 416U appears in front of and slightly below the face of the graphical representation (representing the head of the second user).

Consider an example in which the graphical representation 400U displays on or through an electronic device of the first user (e.g., a HMD, smartphone, or wearable electronic device). The first user sees three different locations for where he or she can select to have binaural sound localize to the second user. The 3D symbols visually inform the first user that the sound is binaural sound. The first user selects one of the indications 412U, 414U, or 416U and transmits the graphical representation 400U to the second user during an electronic communication between the first user and the second user. When the electronic device of the second user receives the graphical representation, the sound plays as binaural sound to the location of the indication selected by the first user. For example, if the first user selected 414U, then the binaural sound originates directly in front of face of the second user since the location of 414U displayed to the first user was directly in front of the face of the graphical representation 400U.

FIG. 4V shows a graphical representation 400V with an indication 410V. The indication includes a menu that enables the user to select how sound will play to the listener. The menu options includes playing the sound as binaural sound, mono sound, or stereo sound. The option "stereo" sound is bolded to indicate this is the option selected by the user.

Consider an example in which the first user sends the graphical representation 400V to the second user. The first user selects the option "binaural sound" from the menu and transmits the graphical representation to the second user. When the electronic device plays the sound of the graphical representation to the second user, the second user hears the sound as binaural sound since this was the selection of the first user.

FIG. 4W shows a graphical representation 400W with an indication 410W. The indication includes a menu that enables the user to select where binaural sound will play to the listener. The menu options includes playing the binaural sound to originate in front of the face or head of the listener, playing the binaural sound to originate to a left side of the face or head of the listener, and playing the sound to originate to a right side of the face or head of the listener. The option "right side" is bolded to indicate this is the option selected by the user.

Consider an example in which the first user records a voice message and sends this voice message as the graphical representation 400W to the second user. The graphical representation is a moving 3D image of the face and head of the first user. The first user selects the option "right side" from the menu and transmits the graphical representation to the second user. When the electronic device plays the sound of the graphical representation to the second user, the graphical representation moves and talks to the second user. This action simulates the first user talking to the second user since the graphical representation emulates, copies, simulates, or represents the first user. The voice of the first user externally localizes to the second user at the location selected by the first user. Here, the first user selected his or her voice to externally localize as binaural sound to a right side of the head of the second user.

FIG. 4X shows a graphical representation 400X with an indication 410X. The indication includes an "X" that represents the SLP where binaural sound will externally localize to the listener. The user can move the indication to different locations around the head or face. This movement enables the user to select a location where the listener will hear the binaural sound. If the user moves the X above the head, then the listener hears the sound above the head. If the user moves the X in front of the face, then the listener hears the sound in front of the face. The user can move the indication to the desired SLP.

Consider an example in which the first user moves the indication 410X to a location in front of the face of the graphical representation. The electronic device calculates a relative location of the indication with respect to the displayee head that is considered as an origin for a coordinate system. The electronic device calculates a coordinate location of the indication on the display with respect to the head. For example, this coordinate location is in spherical coordinates. Once the coordinate location is known, the electronic device consults a lookup table that includes coordinate locations for known HRTFs and selects the HRTF pair that matches the coordinate location calculated between the indication and the head. A processor processes or convolves the sound with the HRTF pair, and sound localizes to the listener at the coordinate location that corresponds to the location of the indication with respect to the displayed head.

Figure 5:
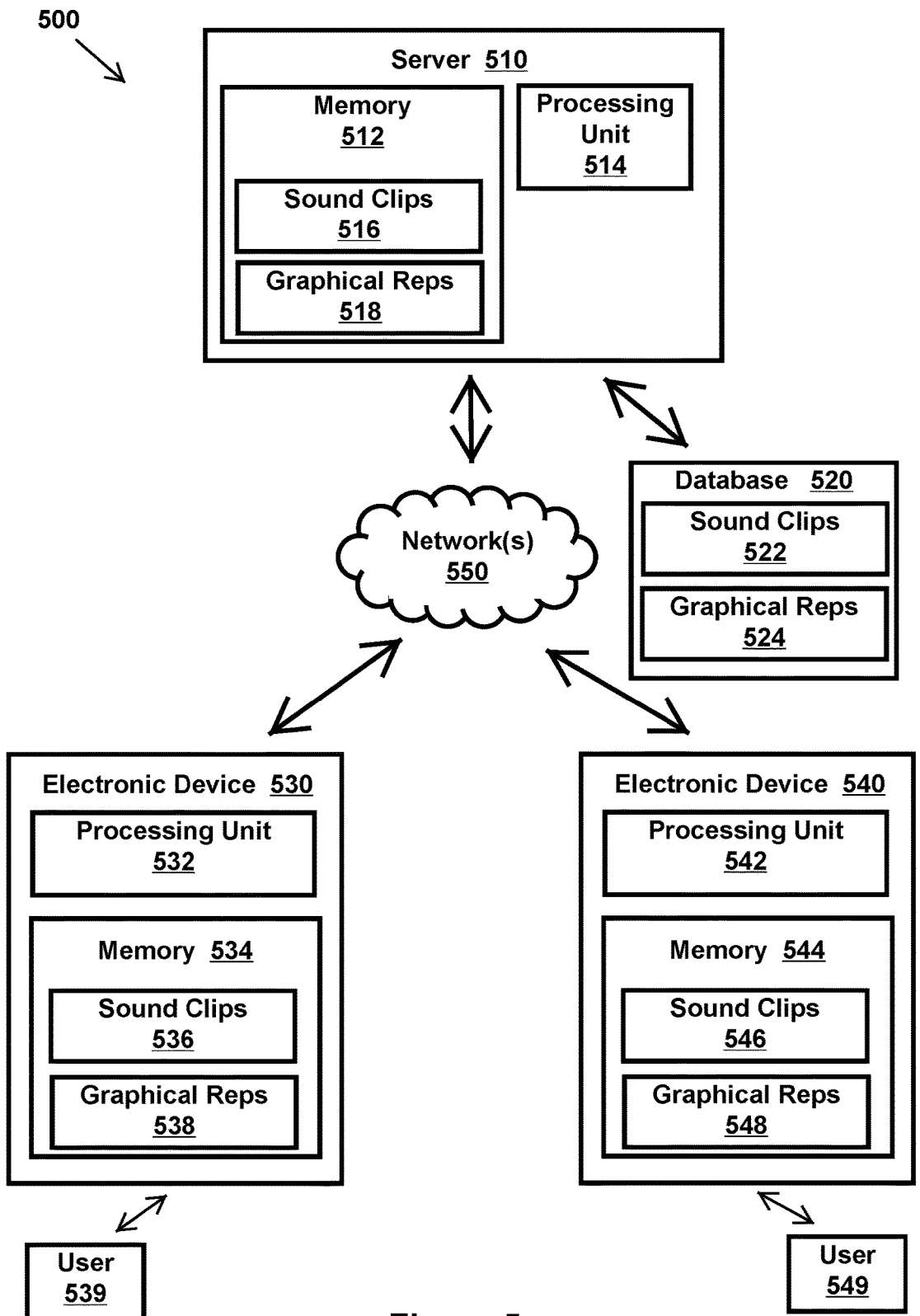
FIG. 5 is an example computer system in accordance with an example embodiment.

FIG. 5 is an example computer system 500 in accordance with an example embodiment.

The computer system 500 includes one or more of a server 510, a database 520, an electronic device 530, and an electronic device 540 in communication over one or more networks 550. User 539 is with or uses electronic device 530, and user 549 is with or uses electronic device 540. For illustration, a single server 510, a single database 520, two electronic devices 530 and 540, and two users 539 and 549 are shown, but example embodiments can include a plurality of servers, databases, electronic devices, and users.

Server 510 includes a memory 512 and a processing unit 514. The memory 521 includes sound clips 516 and graphical representations or graphical reps 518 of the sound clips. The server 510 couples to or communicates with the database 520 that includes sound clips 522 and graphical representations or graphical reps 524.

Electronic device 530 includes a processing unit 532 and memory 534 with sound clips 535 and graphical representations or graphical reps 538. User 539 interacts with or uses electronic device 530.

Electronic device 540 includes a processing unit 542 and memory 544 with sound clips 546 and graphical representations or graphical reps 548. User 549 interacts with or uses electronic device 530.

Figure 6:
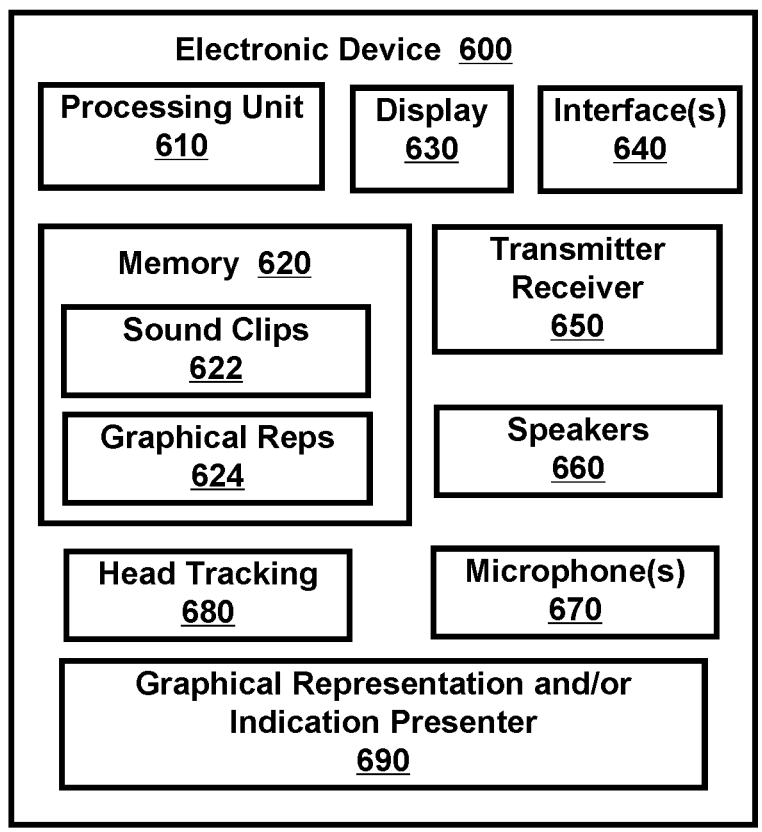
FIG. 6 is an example of an electronic device in accordance with an example embodiment.

FIG. 6 is an example of an electronic device 600 in accordance with an example embodiment.

The electronic device 600 includes a processor or processing unit 610, memory 620 with sound clips 622 and graphical representations or graphical reps 624, a display 630, one or more interfaces 640, a wireless transmitter/receiver 650, speakers 660, one or more microphones 670, head tracking 680 (such as one or more of an inertial sensor, accelerometer, gyroscope, and magnetometer), and a graphical representation and/or indication presenter 690 (e.g., software, hardware, and/or program instructions discussed in figures herein that provide how and/or where the sound is or will play to the listener).

Memory includes computer readable medium (CRM). Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

Sound clips include sound files, sounds, recorded messages (such as voice messages or other recorded sound), computer-generated sounds, and other sound discussed herein. For example, users can record, exchange, and/or transmit sound clips or sounds. These sound include sending streaming sounds or sounds in real-time during an electronic communication.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein.

The electronic device provides sound to the users through one or more speakers. Alternatively or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider another example in which sound clips, graphical representations, and/or HRTFs (or other transfer functions or impulse responses) are stored or cached in the DSP memory or local memory relatively close to the DSP to expedite binaural sound processing.

As used herein, an "emoji" is a graphical representation that includes images, symbols, or icons sent between users in electronic communications (such as text messages, e-mail, and social media) to express an emotional attitude of the writer, convey information, or communicate an message. Emojis can provide sound when activated or executed.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method executed by one or more electronic devices that enables a first user sending an emoji to a second user to select whether the second user will hear sound from the emoji as binaural sound or one of mono and stereo sounds, the method comprising:
    displaying, with a display of a first electronic device of the first user, the emoji that includes a first visual indication that when selected plays the sound from the emoji to the second user in the binaural sound and that includes a second visual indication that when selected plays the sound from the emoji to the second user in one of the mono sound or the stereo sound;
    receiving, at the first electronic device and from the first user, selection of the first visual indication that causes the sound to play to the second user as the binaural sound;
    transmitting the emoji from the first electronic device to a second electronic device of the second user during an electronic communication between the first user and the second user; and
    playing, in response to receiving the selection from the first user of the first visual indication, the sound of the emoji with the second electronic device to the second user so the sound externally localizes to the second user as the binaural sound in empty space at least one meter away from a head of the second user.

2. The method of claim 1, wherein the first visual indication and the second visual indication are located inside a body of the emoji.

3. The method of claim 1 further comprising:
    expediting processing of the sound of the emoji at the second electronic device by convolving, with a digital signal processor (DSP) in the first electronic device, the sound with head-related transfer functions (HRTFs) to change the sound into the binaural sound before transmitting the emoji and the sound from the first electronic device to the second electronic device and in response to receiving the selection of the first visual indication at the first electronic device.

4. The method of claim 1 further comprising:
    displaying, with a display of the second electronic device, the emoji with the first visual indication so the second user can see that the sound was selected by the first user to play to the second user as the binaural sound.

5. The method of claim 1 further comprising:
    receiving, at the first electronic device and from the second electronic device, head-related transfer functions (HRTFs) that are customized to the second user; and
    processing, with a digital signal processor (DSP) in the first electronic device, the sound with the HRTFs that are customized to the second user before transmitting the emoji and the sound to the second electronic device second user.

6. The method of claim 1, wherein the first visual indication includes a symbol "3D" that signifies the binaural sound, and the symbol is located inside a body of the emoji.

7. The method of claim 1, wherein the first visual indication includes an indication located on a right side of the emoji and an indication located on a left side of the emoji, selection by the first user of the indication on the right side of the emoji causes the binaural sound to externally localize to a right side of the head of the second user, and selection by the first user of the indication on the left side of the emoji causes the binaural sound to externally localize to a left side of the head of the second user.

8. A non-transitory computer-readable storage medium that one or more electronic devices execute to enable a first user to select where sound of an emoji localizes to a second user, the method comprising:
displaying, with a display of a first portable electronic device of a first user, an emoji that enables the first user to select between two different locations where the sound of the emoji will externally localize as binaural sound in empty space outside a head of a second user when a second portable electronic device of the second user plays the sound of the emoji to the second user;
receiving, from the first user and at the first portable electronic device of the first user, a selection of one of the two different locations;
transmitting the emoji and the sound to the second portable electronic device of the second user; and
playing, at the second portable electronic device and to the second user, the sound of the emoji such that the sound of the emoji externally localizes as the binaural sound at the one of the two different locations selected by the first user that is in the empty space outside the head of the second user.

9. The non-transitory computer-readable storage medium of claim 8 further comprising:
saving processing resources of a digital signal processor (DSP) in the second portable electronic device of the second user by convolving, with head-related transfer functions (HRTFs), the sound of the emoji into the binaural sound with a DSP in the first portable electronic device of the first user before transmitting the emoji and the sound to the second portable electronic device of the second user.

10. The non-transitory computer-readable storage medium of claim 8 further comprising:
displaying, with the display of the first portable electronic device of the first user, the two different locations as a first location that when selected provides the sound to the second user in front of and to a left side of the head of the second user and a second location that when selected provides the sound to the second user in front of and to a right side of the head of the second user to enable the first user to select between the first location and the second location.

11. The non-transitory computer-readable storage medium of claim 8 further comprising:
displaying, with a display of the second portable electronic device, a visual indication to the second user that the first user selected the sound to externally localize as the binaural sound to the second user at the one of the two different locations.

12. The non-transitory computer-readable storage medium of claim 8 further comprising:
displaying, with the display of the first portable electronic device of the first user, the two different locations where the sound of the emoji will externally localize as the binaural sound in the empty space outside the head of the second user as a first visual indication that is located away from and on a right side of the emoji and a second visual indication that is located away from and on a left side of the emoji.

13. The non-transitory computer-readable storage medium of claim 8 further comprising:
enabling the first user to select where the sound of the emoji localizes to the second user by displaying, with the display of the first portable electronic device of the first user, a first option that when selected provides the sound to the second user as stereo sound and a second option that when selected provides the sound to the second user at one of the two different locations where the sound of the emoji will externally localize as the binaural sound.

14. A method executed by one or more electronic devices during an electronic communication between a first user and a second user that enables the first user to select how sound of an emoji plays to the second user, the method comprising:
displaying, with a display of a portable electronic device (PED) of the first user, the emoji that enables the first user to select between playing the sound to the second user as binaural sound that externally localizes outside a head of the second user and playing the sound to the second user as one of stereo sound and mono sound;
receiving, at the PED of the first user and from the first user, selection of playing the sound to the second user as the binaural sound that externally localizes outside the head of the second user;
transmitting, from the PED of the first user and to the PED of the second user, the emoji and the sound; and
playing, by the PED of the second user and to the second user, the sound of the emoji such that the sound plays to the second user as selected by the first user as the binaural sound that externally localizes outside the head of the second user.

15. A method of claim 14 further comprising:
displaying, with a display of the PED of the second user, the emoji with a visual indication that the sound will play to the second user as the binaural sound; and
receiving, at the PED of the second user, activation of the emoji by the second user to the play the sound as the binaural sound that externally localizes outside the head of the second user.

16. A method of claim 14 further comprising:
expediting playing of the sound to the second user by convolving, with a digital signal processor (DSP) in the PED of the second user, the sound with head-related transfer functions (HRTFs) before the second user activates the emoji to play the sound so that the sound is already convolved into the binaural sound by the DSP before the second user activates the sound to play.

17. A method of claim 14 further comprising:
simultaneously displaying, with the display of the PED of the first user, a first visual indication that when selected by the first user selects playing of the sound to the second user as the binaural sound and a second visual indication that when selected by the first user selects playing of the sound to the second user as one of the stereo sound and the mono sound.

18. A method of claim 14 further comprising:
displaying, with a display of the PED of the second user, the emoji with a visual indication that includes "3D" to show the second user that the first user selected the sound to play to the second user as the binaural sound.

19. A method of claim 14 further comprising:
displaying, with the display of the PED of the first user, at least three options to enable the first user to select where the sound will localize to the second user, wherein the three options include a location with respect to the head of the second user having azimuth coordinates ($0°<\theta\leq45°$), a location with respect to the head of the second user having azimuth coordinates ($0° > θ ≥ -45°$), a location inside the head of the second user.

20. A method of claim 14 further comprising:
displaying, with a display of the PED of the second user, a visual notification informing the second user that the first user selected playing of the sound to the second user as the binaural sound that externally localizes outside the head of the second user.

* * * * *